(12) United States Patent
Peng et al.

(10) Patent No.: US 7,790,059 B2
(45) Date of Patent: Sep. 7, 2010

(54) STAGED HYDROCARBON/STEAM REFORMER APPARATUS AND METHOD

(75) Inventors: Xiang-Dong Peng, Orefield, PA (US); John Michael Repasky, Allentown, PA (US); Blaine Edward Herb, New Tripoli, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 343 days.

(21) Appl. No.: 11/874,497

(22) Filed: Oct. 18, 2007

(65) Prior Publication Data
US 2009/0104110 A1 Apr. 23, 2009

(51) Int. Cl.
*B01J 8/06* (2006.01)
*C01B 3/26* (2006.01)

(52) U.S. Cl. ............... 252/373; 48/61; 422/193; 422/194; 423/652; 423/653

(58) Field of Classification Search .......... 422/193, 422/194; 252/373; 423/652, 653; 48/61
See application file for complete search history.

(56) References Cited

U.S. PATENT DOCUMENTS

| | | | |
|---|---|---|---|
| 2,537,708 A | | 1/1951 | Scharmann |
| 3,264,066 A | * | 8/1966 | Quartulli et al. ........... 423/654 |
| 4,750,986 A | * | 6/1988 | Pinto ........................ 208/64 |
| 5,039,510 A | * | 8/1991 | Pinto ........................ 423/652 |
| 5,181,937 A | | 1/1993 | Karafian et al. |
| 6,224,789 B1 | * | 5/2001 | Dybkjaer .................... 252/373 |
| 6,527,980 B1 | | 3/2003 | Roden et al. |
| 2003/0027096 A1 | | 2/2003 | Barnett et al. |
| 2004/0063797 A1 | * | 4/2004 | Aasberg-Petersen et al. ........................ 518/704 |
| 2004/0065014 A1 | * | 4/2004 | Christensen et al. ....... 48/198.7 |

FOREIGN PATENT DOCUMENTS

| | | |
|---|---|---|
| EP | 0437059 A2 | 7/1991 |
| EP | 1 162 170 A1 | 12/2001 |
| EP | 1 329 256 A1 | 7/2003 |
| EP | 1 403 217 A1 | 3/2004 |
| EP | 1403216 A1 | 3/2004 |
| EP | 1 734 002 A2 | 12/2006 |
| GB | 1270071 | 4/1972 |

OTHER PUBLICATIONS

Light, William Robert, "Axial Convective Reformer", U.S. Appl. No. 11/153,025.

* cited by examiner

*Primary Examiner*—Wayne Langel
(74) *Attorney, Agent, or Firm*—Keith D. Gourley; Bryan C. Hoke, Jr.

(57) ABSTRACT

A staged steam hydrocarbon reformer is disclosed having a chamber within which convectively heated reformer stages are enclosed. The reformer stages are tubes containing steam reforming catalyst. The stages are in serial fluid communication with one another through mixing vessels positioned between each stage. The first reforming stage is fed a mixture of steam and a gaseous hydrocarbon. Partially reformed gases having increased hydrogen concentration are produced at each stage and are mixed with additional gaseous hydrocarbon and optionally steam in the mixing vessels. Collection and distribution manifolds provide fluid communication between the reformer stages and the mixing vessels. A method is also disclosed in which partially reformed gases from a preceding stage are mixed with gaseous hydrocarbon and steam having a lower steam to carbon ratio than the fresh feed to the previous stage.

25 Claims, 9 Drawing Sheets

STAGED HYDROCARBON/STEAM REFORMER APPARATUS AND METHOD

BACKGROUND OF THE INVENTION

This invention relates to an apparatus and method for steam reforming of gaseous hydrocarbons to form a synthesis gas comprising hydrogen.

Hydrogen may be produced from hydrocarbons contained in compounds such as gasified coal, coke, oil, and oil refinery waste products as well as natural gas, biogas and other compounds using a hydrogen reforming process. A well known example of this process is steam methane reforming, wherein methane and steam are reacted at temperatures between about 400° C. and about 1000° C. in the presence of a metal catalyst to yield a synthesis gas comprising carbon monoxide and hydrogen as described in the chemical equation $CH_4 + H_2O \rightarrow CO + 3H_2$. A part of the carbon monoxide thus produced may be further converted to hydrogen and carbon dioxide by the water gas shift reaction as described in the chemical equation $CO + H_2O \rightarrow CO_2 + H_2$ to further increase the hydrogen content of the synthesis gas. The synthesis gas containing hydrogen and carbon dioxide may then be further treated in a purification unit, such as a pressure swing adsorption unit, to separate the carbon dioxide and other unwanted constituent gases to yield a product gas having a high concentration of hydrogen.

Hydrogen reforming reactors for the industrial production of hydrogen according to the aforementioned reforming process comprise a plurality of metal tubes, each typically 7-15 cm in diameter and 9-12 meters long, that contain a granular medium, such as ceramic pellets which support the metal catalyst, for example, nickel in the form of nickel oxide (NiO). The nickel oxide reduces to nickel with hydrogen and/or methane or natural gas and becomes active for the hydrogen reforming reaction. Because the reforming reaction is endothermic, the tubes are heated within appropriate temperature limits to support the chemical reactions while not exceeding the temperature limits of the tubes.

Prior art steam reforming apparatuses and methods suffer from various disadvantages. For example, the problem of catalyst fouling due to carbon formation on the catalyst, known as "coking", limits the efficiency of the process by limiting the minimum steam to carbon ratio of the process. It would be advantageous to reduce the steam to carbon ratio without coking of the catalyst and reduce the energy required, and thereby the cost to produce hydrogen.

BRIEF SUMMARY OF THE INVENTION

The invention concerns a steam/hydrocarbon reformer for producing a synthesis gas comprising hydrogen from gaseous hydrocarbon and steam. The reformer is convectively heated by a hot gas and comprises a chamber having an entrance for receiving the hot gas and an exit for discharging the hot gas. A plurality of first tubes is positioned within the chamber. The first tubes contain a steam reforming catalyst. Each of the first tubes has a first tube inlet for receiving a first mixture comprising gaseous hydrocarbon and steam and a first tube outlet for discharging a first partially reformed gas. A mixing vessel has a first inlet in fluid communication with the first tube outlets for receiving the first partially reformed gas. The mixing vessel also has a second inlet for receiving a second mixture comprising gaseous hydrocarbon, and a mixing vessel outlet. A plurality of second tubes is positioned within the chamber. The second tubes contain a steam reforming catalyst. Each of the second tubes has a second tube inlet in fluid communication with the mixing vessel outlet and a second tube outlet for discharging a second partially reformed gas.

The invention also encompasses a method of steam reforming gaseous hydrocarbons to produce the synthesis gas using the aforementioned reformer. The method comprises:
(a) heating the chamber with the hot gas;
(b) passing the first mixture of gaseous hydrocarbon and steam through the first tubes;
(c) transferring heat convectively from the hot gas to the first tubes;
(d) reacting the first mixture of gaseous hydrocarbon and steam with the reforming catalyst in the first tubes to produce the first partially reformed gas having a higher concentration of hydrogen than the first mixture of gaseous hydrocarbon and steam;
(e) combining the first partially reformed gas with the second mixture comprising gaseous hydrocarbon in the mixing vessel;
(f) passing the first partially reformed gas and the second mixture comprising gaseous hydrocarbon through the second tubes;
(g) transferring heat convectively from the hot gas to the second tubes; and
(h) reacting the first partially reformed gas and the second mixture comprising gaseous hydrocarbon with the catalyst in the second tubes to produce the second partially reformed gas having a higher concentration of hydrogen than the first partially reformed gas.

In another embodiment, a convectively heated steam/hydrocarbon reformer for producing a synthesis gas comprising hydrogen from gaseous hydrocarbon and steam comprises a chamber having an entrance for receiving the hot gas and an exit for discharging the hot gas. A plurality of reformer stages are in serial fluid communication with one another. Each reformer stage is positioned within the chamber and comprises a plurality of tubes containing a steam reforming catalyst. Each of the tubes has an inlet for receiving a gas and an outlet for discharging a gas. Each reformer stage also includes a plurality of mixing vessels, one the mixing vessel being positioned between each reformer stage. Each mixing vessel has a first inlet in fluid communication with the tubes of one of the reformer stages and a second inlet for receiving a mixture comprising gaseous hydrocarbon. Each mixing vessel also has a mixing vessel outlet in fluid communication with the tubes of another of the reformer stages.

Another method according to the invention used with the immediately preceding reformer comprises:
(a) heating the chamber with the hot gas;
(b) passing the gaseous hydrocarbon and steam serially through the plurality of reformer stages;
(c) transferring heat convectively to the gaseous hydrocarbon and steam in each of the reformer stages;
(d) reacting the gaseous hydrocarbon and steam with the reforming catalyst in each of the reformer stages thereby producing a partially reformed gas with an increased hydrogen concentration after each of the reformer stages; and
(e) mixing a fresh feed comprising gaseous hydrocarbon with the partially reformed gas between each of the reformer stages.

DETAILED DESCRIPTION OF THE INVENTION

Figures 1, 2:
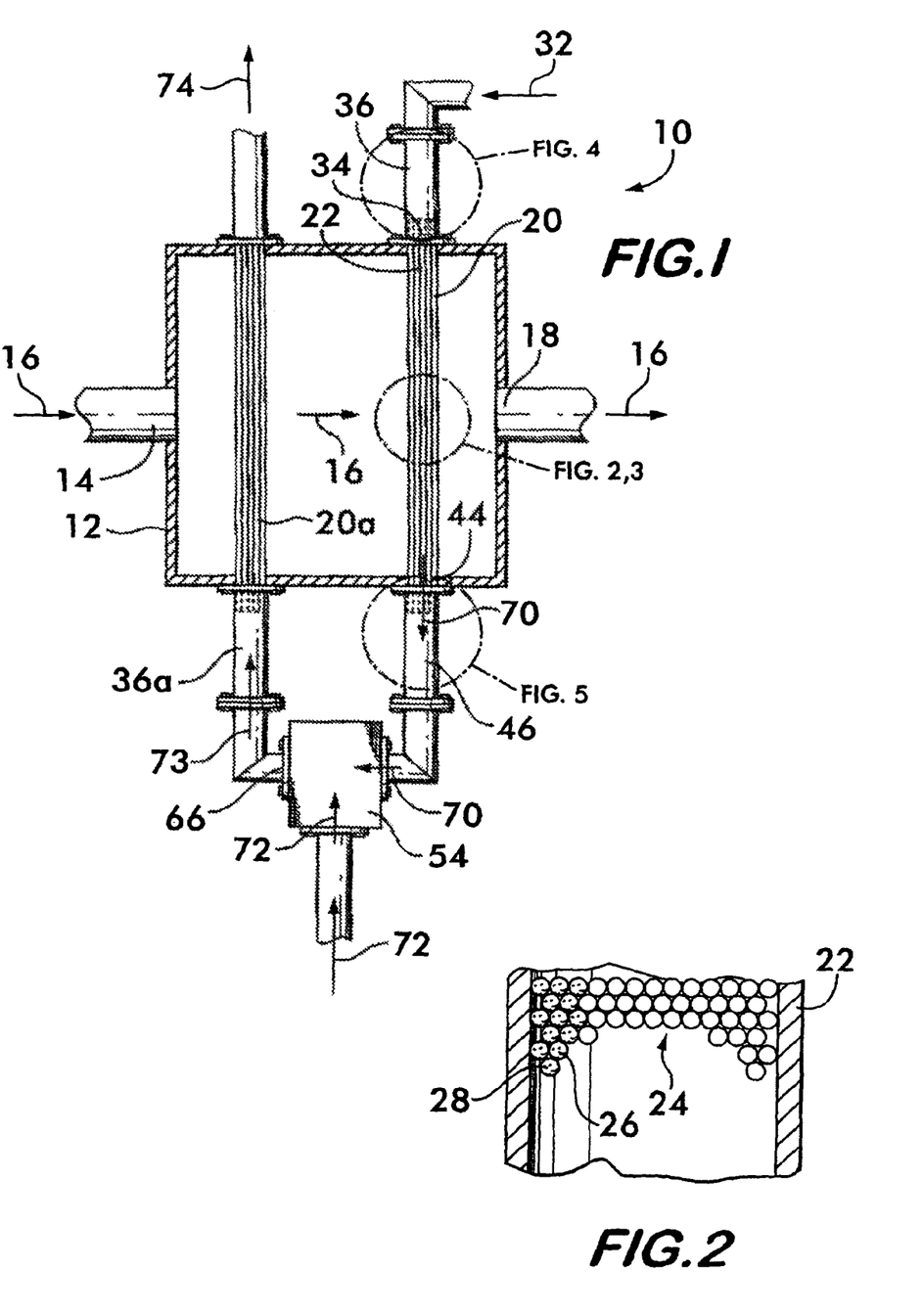
FIG. 1 is a schematic illustration of a staged hydrocarbon/steam reformer according to the invention.
FIG. 2 is a sectional view of a portion of the reformer shown in FIG. 1 and taken from the circle denoted "FIGS. 2, 3"

FIG. 1 shows a schematic representation of a steam hydrocarbon reformer 10 for producing a synthesis gas comprising hydrogen from gaseous hydrocarbons and steam according to the invention. Reformer 10 comprises a chamber 12 having an inlet 14 for admitting hot gases 16 to the chamber, and an exit 18 for discharging the hot gases from the chamber. The hot gases may be combustion products such as flue gases recovered from other processes, as well as hot synthesis gas.

Figure 3:
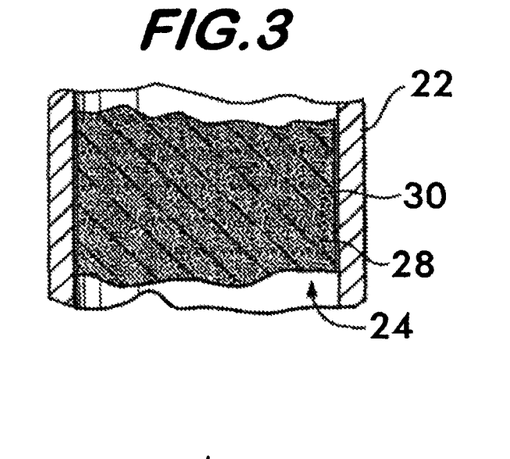
FIG. 3 is a sectional view of an alternate embodiment of a portion of the reformer shown in FIG. 1 and taken from the circle denoted "FIGS. 2, 3"

A plurality of reformer stages 20 are positioned within chamber 12. Each reformer stage comprises a plurality of tubes 22 which contain a steam reforming catalyst. The tubes of a stage may be, for example, between about 2.5 to about 25 cm in diameter and between about 1.5 to about 12 meters in length. The tubes may be formed of high temperature alloy materials such as stainless steel, Incolloy 800, inconel 600 or micro alloys such as HP-50, able to withstand temperatures in the range of 425 to about 1,000° C. and most preferably between about 540 and about 800° C. corresponding to the temperature range over which the steam/hydrocarbon reforming process is run. As shown in detail in FIG. 2, the reforming catalyst 24 may take the form of a granular medium, such as ceramic pellets 26 coated with a metal based catalyst 28, such as nickel oxide, which catalyzes the steam-hydrocarbon reaction. FIG. 3 shows another embodiment of a reforming catalyst 24, comprising structural supports 30 coated with the metal based catalyst 28. Various types of structural supports are feasible, such as those marketed by Sulzer Chemtech Ltd. of Winterthur, Switzerland. These structural supports comprise a plurality of plates configured so as to present a large surface area, deflect a gas stream passing through the tubes, and allow gas flow at low resistance. The particular configuration of such structural supports varies, but includes plates having corrugations oriented angularly to the direction of gas flow, cross corrugated materials having flat plates alternating with corrugated plates as well as radial flow and chordal flow arrangements.

Figure 4:
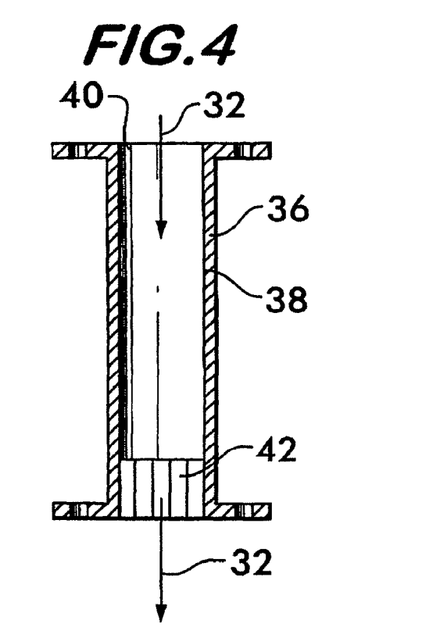
FIG. 4 is a sectional view of a component of the reformer taken at the circle denoted "FIG. 4" in FIG. 1.

With reference again to FIG. 1, the tubes 22 of reformer stages 20 are primarily convectively heated by the hot gases 16 within the chamber to sustain the endothermic steam/hydrocarbon reforming reaction, which occurs when a first mixture comprising gaseous hydrocarbon and steam 32 contacts the reforming catalyst within the tubes. Tubes 22 have inlets 34 which are in fluid communication with a distribution manifold 36 which conducts the gaseous hydrocarbon and steam mixture 32 to the reformer tubes 22. Distribution manifold 36 is shown in detail in FIG. 4 and comprises a housing 38 having an inlet 40 and a plurality of outlets 42 which distribute the gas mixture to the inlets 34 of tubes 22.

Figure 5:
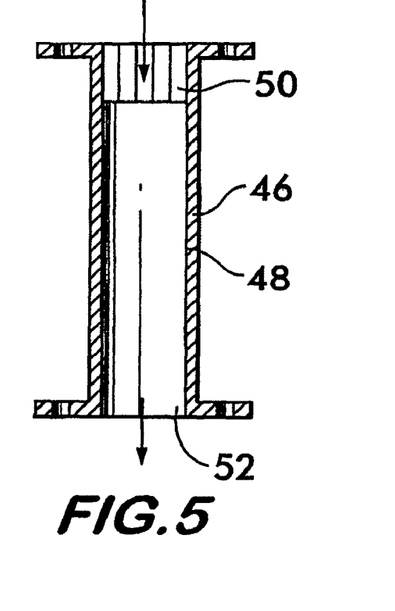
FIG. 5 is a sectional view of a component of the reformer taken at the circle denoted "FIG. 5" in FIG. 1.
Figure 6:
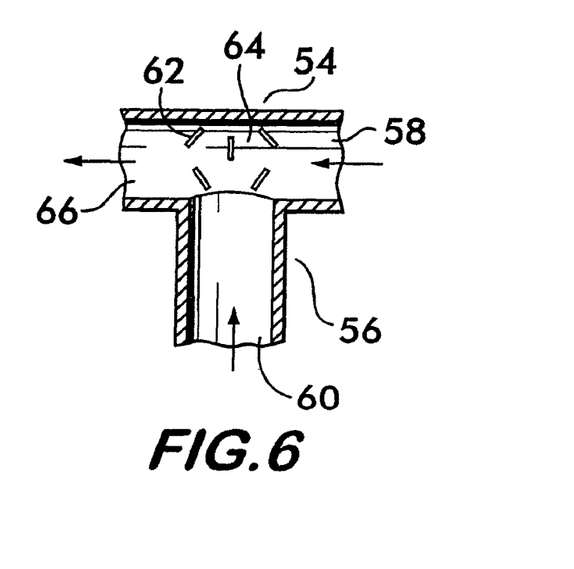
FIG. 6 is a sectional view of a component of the reformer.

As shown in FIGS. 1 and 5, tubes 22 have outlets 44 which are in fluid communication with a collection manifold 46, shown in detail in FIG. 5. Collection manifold 46 comprises a housing 48 having a plurality of inlets 50 in fluid communication with the outlets 44 of tubes 22, and an outlet 52. FIG. 1 also shows the collection manifold 46 in fluid communication with a mixing vessel 54. An example of a mixing vessel is shown in detail in FIG. 6, and comprises a Tee pipe fitting 56 having a first inlet 58 in fluid communication with the collection manifold 46, and a second inlet 60 which receives a mixture comprising gaseous hydrocarbon (which may include steam) for mixing with the gas exiting from the tubes 22 of the first stage 20. To facilitate mixing of the gases within the mixing vessel static mixing elements 62 may be included within an internal bore 64 of the mixing vessel. Static mixing elements may take the form of geometric elements, such as baffle plates or helically arranged strakes which use the energy of the flow passing through the mixing vessel to mix two or more fluids. Alternately, the mixing vessel should have sufficient length downstream of the inlets 58 and 60 to ensure adequate mixing of the gas streams.

Mixing vessel 54 has an outlet 66 that is in fluid communication with another collection manifold 36a as shown in FIG. 1. Collection manifold 36a is in fluid communication with a second reformer stage 20a, which is positioned within the chamber 12. In a preferred configuration, the second reformer stage 20a is positioned between the chamber inlet 14 and the first reformer stage 20. This configuration allows the incoming mixture of gaseous hydrocarbon and steam 32 in the first reformer stage 20 to be convectively heated by the hot gas 16 after the gas 16 has already supplied some of its heat to the second reformer stage 20a. As a result, a larger quantity of lower level heat will be used to provide sensible heating of the relatively cool incoming gas mixture 32, thereby avoiding the disadvantages associated with using high level heat for low level heating requirements.

A method of steam/hydrocarbon reforming using the apparatus according to the invention is described below with reference to FIG. 1. The first mixture comprising gaseous hydrocarbon and steam 32 (known as the fresh feed to the first stage) is supplied to the distribution manifold 36 at a temperature between about 370 and about 700° C. and a pressure between about atmospheric and about 5 MPa for typical steam-methane reforming processes. The steam to carbon ratio of the fresh feed 32 is between about 1.5 and about 3.5. The distribution manifold 36 conducts the fresh feed 32 to the first reformer stage 20, which is convectively heated by hot gases 16 within the chamber 12 to a temperature between about 540 and about 650° C. The hot gas 16 enters chamber 12 at a temperature between about 650 and about 1540° C. and a pressure between about atmospheric and about 14 MPa, and exits the chamber at a temperature between about 425 and about 700° C. Atmospheric pressure is typical of a hot flue gas leaving a furnace and 14 MPa would be typical of a hot synthesis gas from a partial oxidation unit.

Steam/hydrocarbon reforming reactions are catalyzed within the tubes 22 of the first reformer stage and the fresh feed 32 is partially reformed into a first partially reformed gas 70 which exits the first reformer stage having a hydrogen concentration between about 2% and about 20% as expressed on a wet basis. The first partially reformed gas 70 flows through the collection manifold 46 and into the mixing vessel 54 where it is mixed with a second mixture 72 comprising gaseous hydrocarbon (known as the fresh feed to the second stage) at a temperature between about 370 and about 700° C., and a pressure between about atmospheric and about 14 MPa. The fresh feed 72 is preferably combined with steam at a steam-to-carbon ratio up to about 2, but less than the steam-to-carbon ratio of the fresh feed to the first stage 32. A mixture 73 comprising the first partially reformed gas 70 and the fresh feed 72 (and the steam, if present) exits the mixing vessel 54 through the mixing vessel outlet 66 and enters the second distribution manifold 36a. Manifold 36a conducts the gas mixture 73 to the second reformer stage 20a which is convectively heated to a temperature between about 540 and about 1000° C. by the hot gas 16 within the chamber 12. Again, steam reforming reactions are catalyzed within the tubes 22 of the second reformer stage 20a yielding a second partially reformed gas 74 having a higher hydrogen concentration than the first partially reformed gas 70. The second partially reformed gas 74 exiting the second reformer stage 20a has a hydrogen concentration between about 5% and about 50% expressed on a wet basis.

Figure 7:
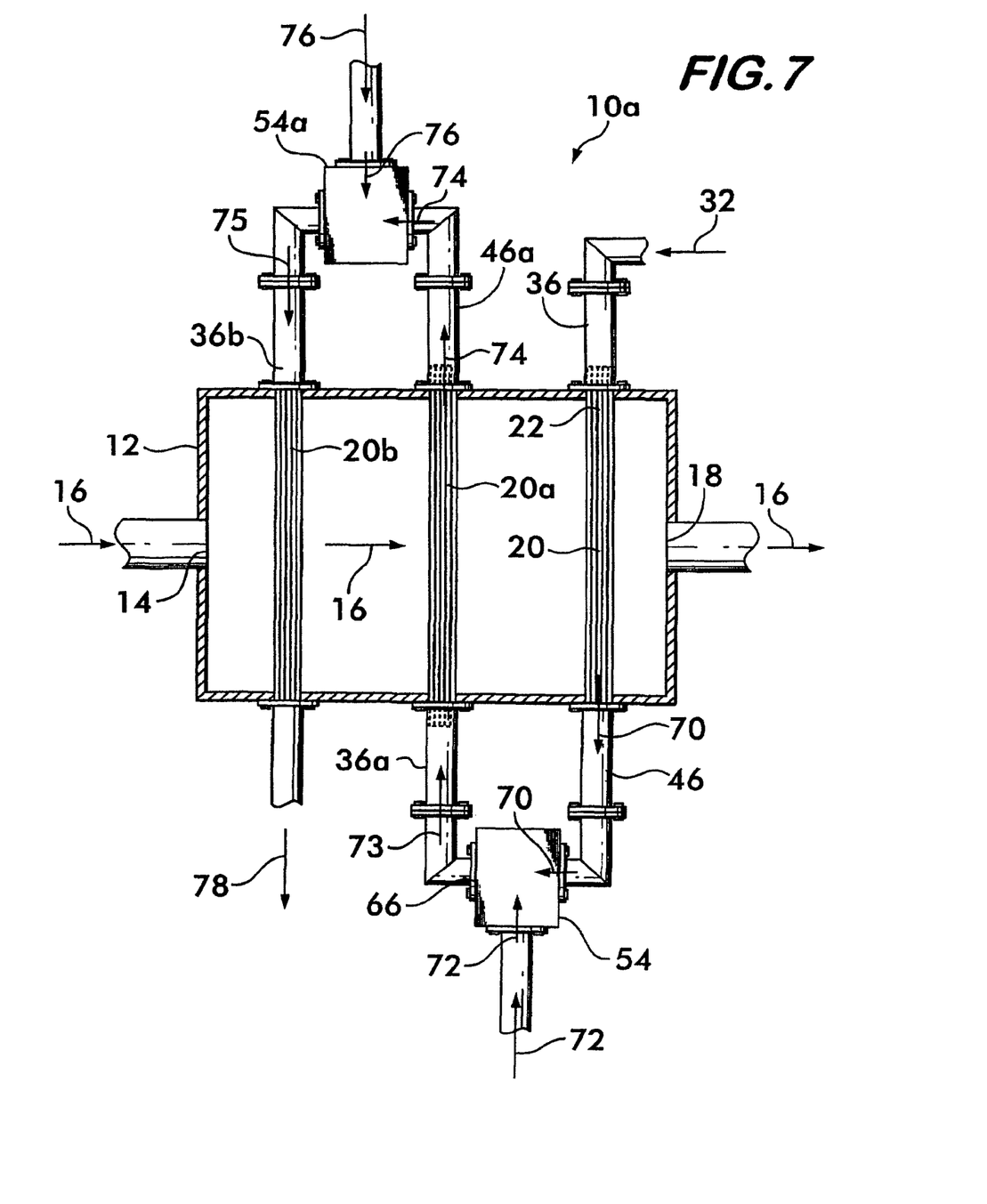
FIGS. 7-10 are schematic views of alternate embodiments of reformers according to the invention.

A third reformer stage may be added for further processing. Apparatus 10a, shown in FIG. 7, is similar to apparatus 10 of FIG. 1, but has a second collection manifold 46a in communication with a second mixing vessel 54a. The second partially reformed gas 74 is received in the second collection manifold 46a and is mixed in the second mixing vessel 54a with a gas mixture 76 comprising gaseous hydrocarbon and known as the fresh feed to the third stage. The fresh feed 76 and the second partially reformed gas 74 comprise a mixture 75 which is fed through a third distribution manifold 36b to the aforementioned third reformer stage 20b to further increase the hydrogen concentration of the second partially reformed gas 74. The fresh feed to the third stage 76 comprising gaseous hydrocarbon may also be mixed with steam at a steam-to-carbon ratio up to about 2, but preferably less than the steam-to-carbon ratio of the fresh feed to the second stage 72 fed to the first mixing vessel 54. A third partially reformed gas 78 exits the third reformer stage 20b. This gas stream may be fed to additional reforming stages similar to those described above, or it may be the synthesis gas which is conducted away for further processing, such as separation of the hydrogen in a pressure swing adsorption unit. At any one reformer stage the steam-to-carbon ratio of the fresh feed at that stage is preferably less than the steam-to-carbon ratio of the fresh feed of a previous stage. This results in an average or overall steam-to-carbon ratio for the process that is lower than the steam-to-carbon ratio of a single stage reforming process. The average or overall steam-to-carbon ratio for a system of staged reformers according to the invention is defined as the ratio of the total steam molar flow in the fresh feeds to all stages to the total carbon molar flow in the fresh feeds to all stages.

Figure 8:
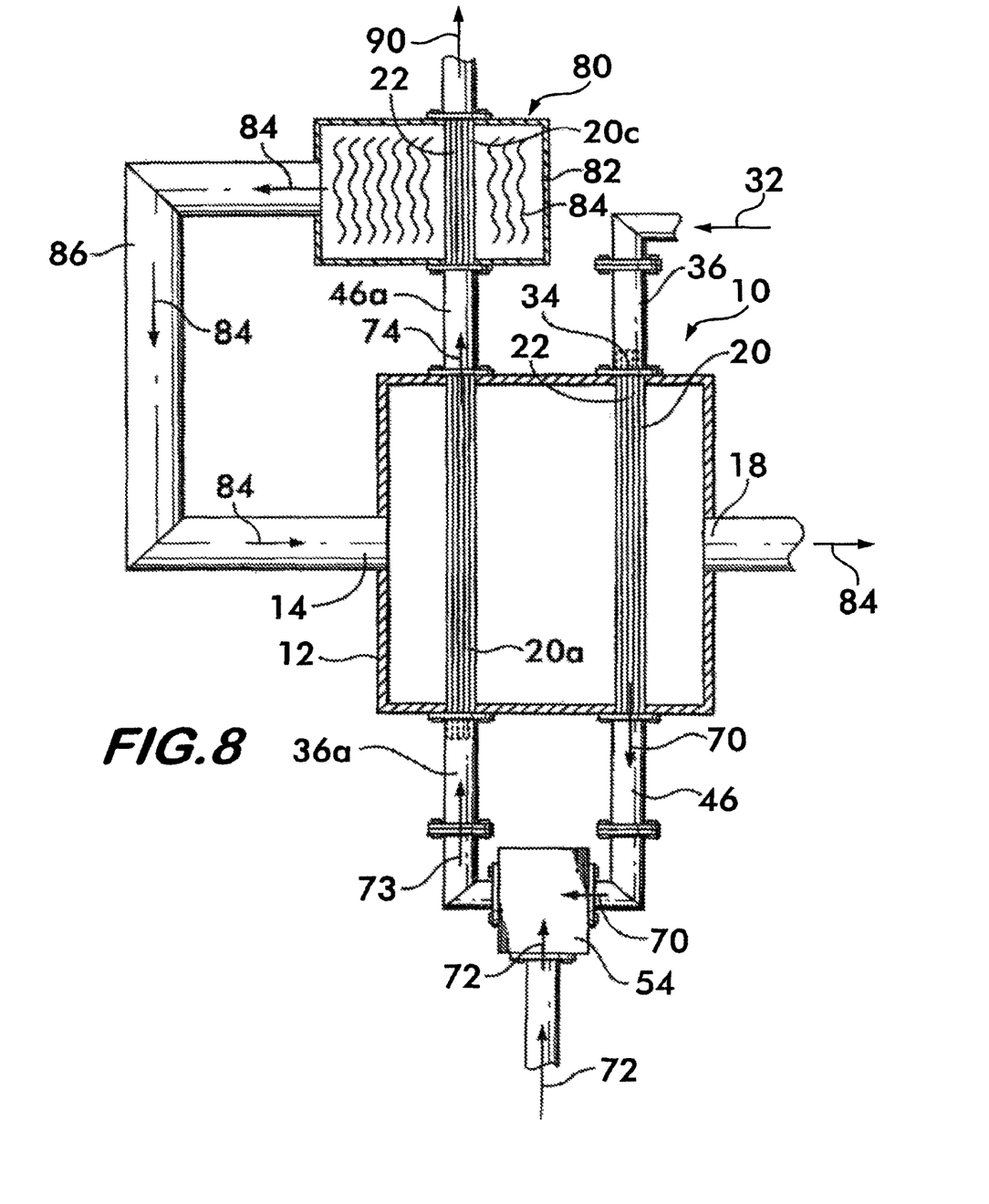

As shown in FIG. 8, the apparatus 10 may be used as a pre-reformer for a fired reformer 80. Fired reformer 80 comprises a furnace 82 in which fuel is combusted to heat a fired reformer stage 20c comprising tubes 22 containing steam reforming catalyst. In contrast to the convective heat transfer associated with the pre-reformer, heating of the fired reformer stage is mainly by radiative heat transfer to the tubes. Fired reformer stage 20c receives second partially reformed gas 74 from the second convectively heated reformer stage 20a and produces a further reformed gas 90. The hot combustion gases 84 produced within the furnace may be supplied to the chamber 12 through a duct 86 for convectively heating the various reforming stages 20, 20a.

Figure 8A:
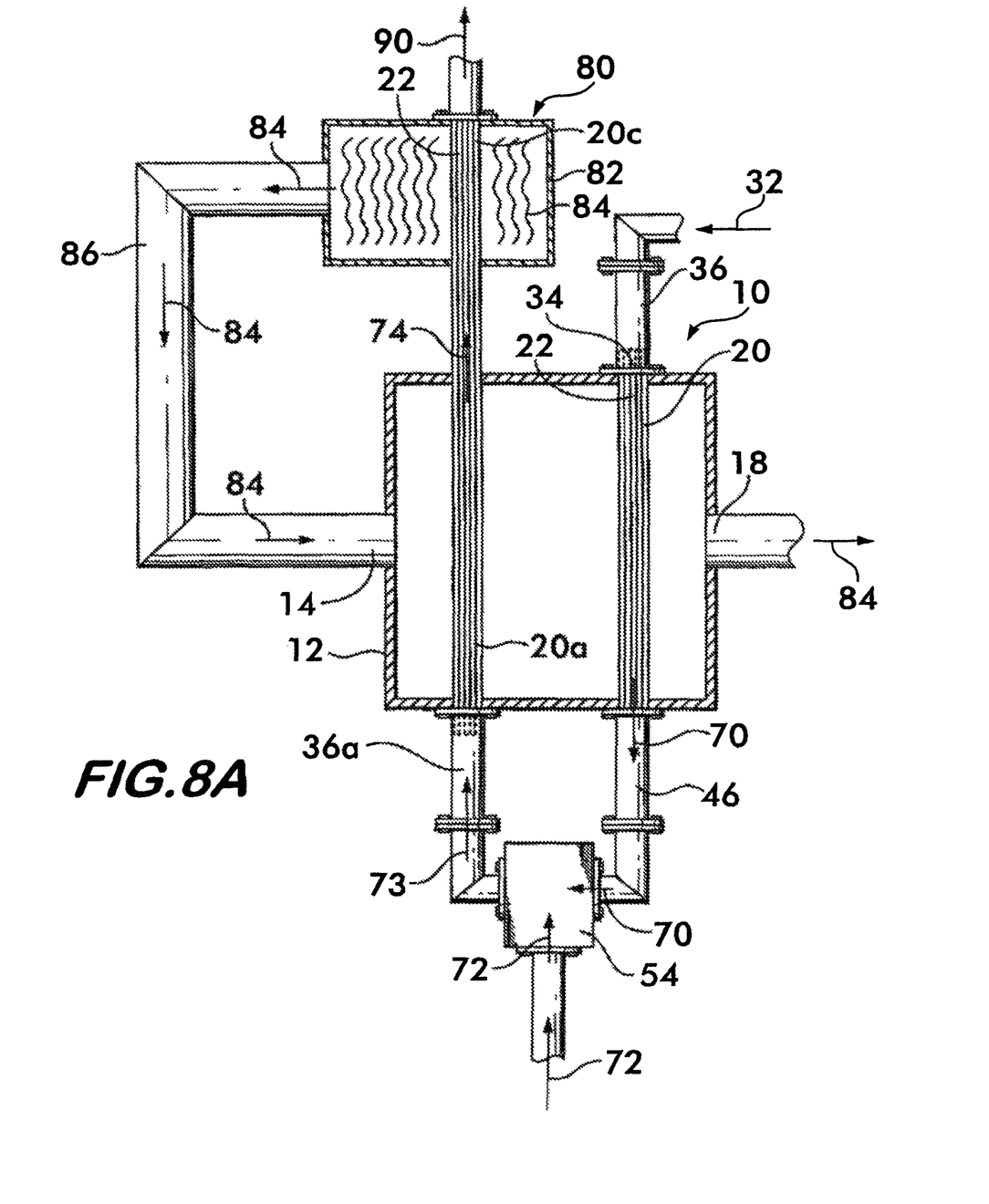

FIG. 8A illustrates another embodiment of an apparatus according to the invention wherein the tubes 22 of the second stage 20 are extended into the fired reformer 80 wherein the second partially reformed gas 74 from the second convectively heated reformer stage 20a is further reformed to produce a further reformed gas 90. This configuration eliminates the need for collection and distribution manifolds between the pre-reformer and the fired reformer.

Figure 9:
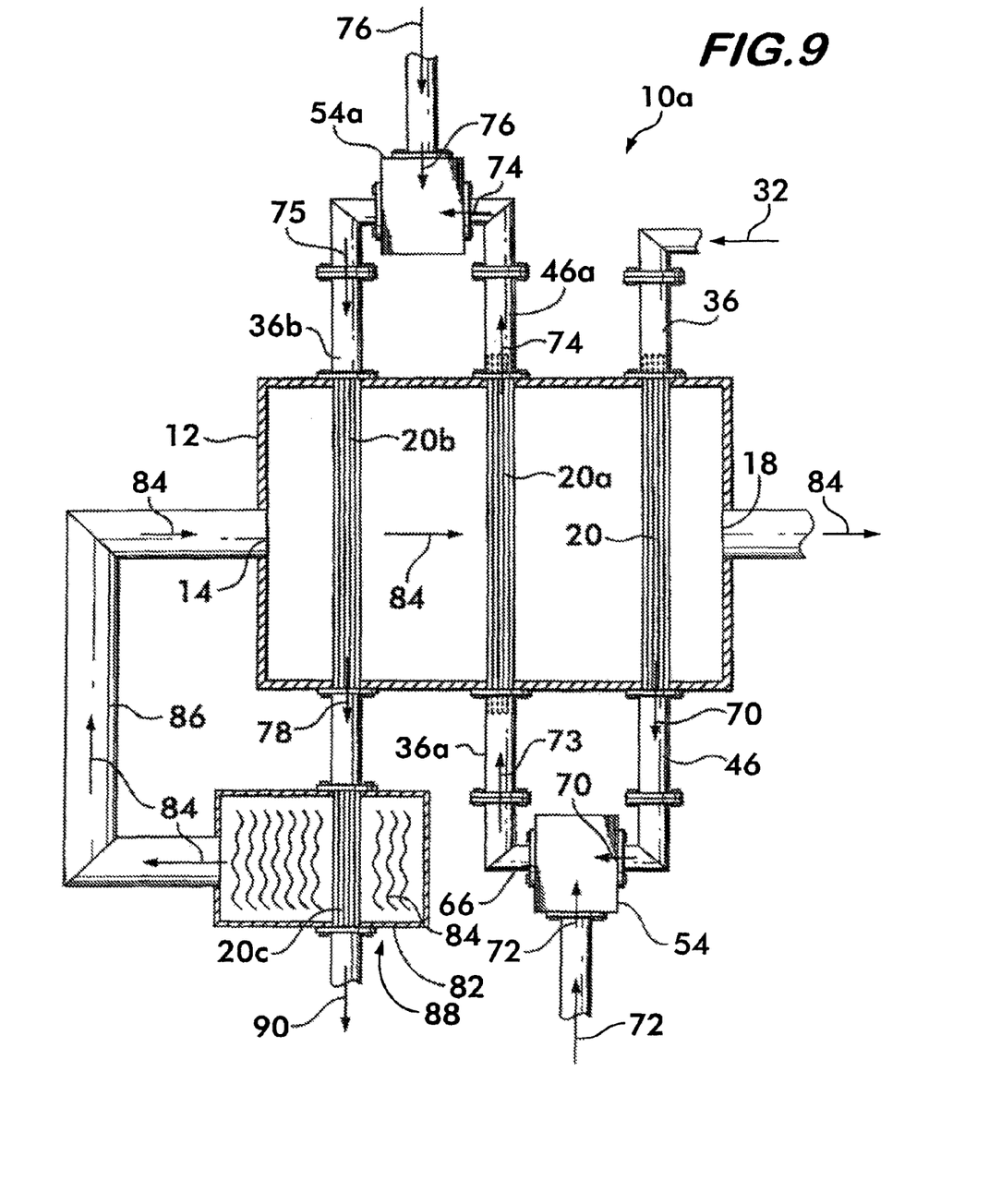

FIG. 9 illustrates a fired reformer 88 having a three stage pre-reformer 10a which receives its hot gases 84 from the furnace 82 of the fired reformer stage 20c. Reformer stage 20c receives the third partially reformed gas 78 from the third reformer stage 20b and produces a further reformed gas. It is understood that more than three pre-reforming stages could be used in the apparatus and method according to the invention, and the hot gases 84 heating the reforming stages in chamber 12 could be provided from many other sources such as flue gas from combustion processes such as reforming furnaces, gas turbines, glass melting furnaces, heat treating furnaces and hot synthesis gas from reforming processes such as steam methane reforming, ATR and partial oxidation reduction.

Figure 10:
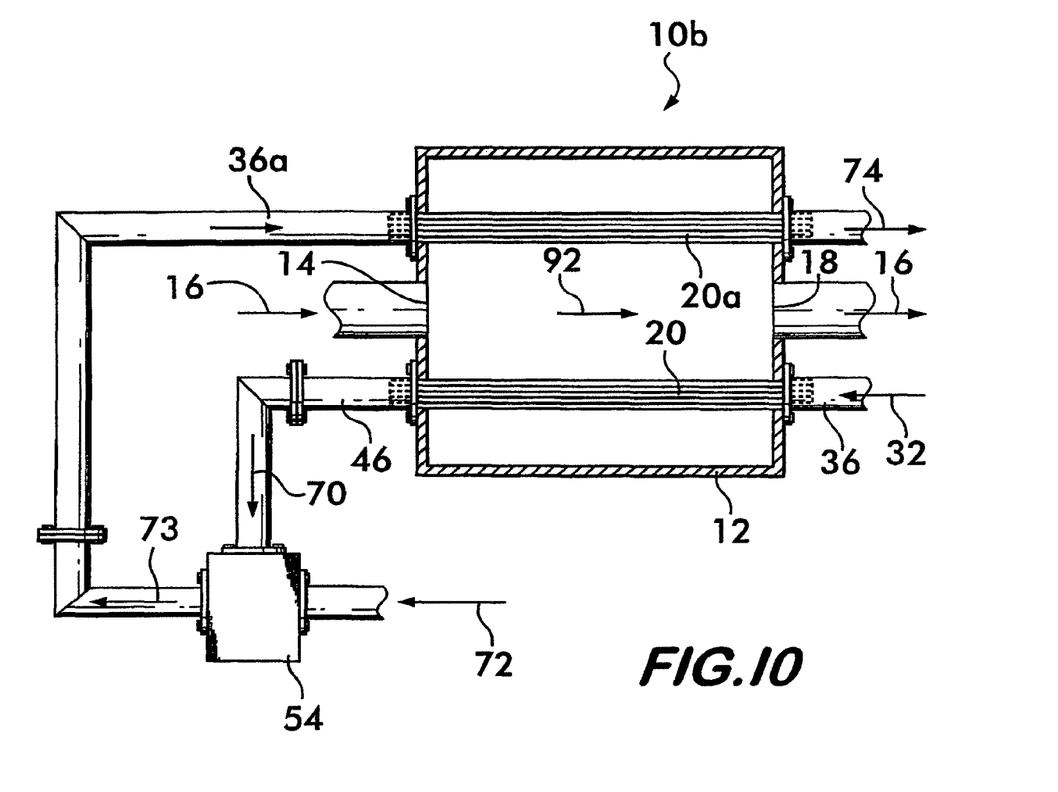

FIG. 10 shows another embodiment 10b of the reformer according to the invention wherein the reforming stages 20 and 20a are arranged substantially parallel to a flow path 92 of gases through the chamber 12, thus heating the gases within the reforming stages in parallel rather than in series. The flow of gases through the stages relative to the hot gas flow through the chamber could be co-current or counter-current.

The arrangement and flow directions of the stages for the apparatus according to the invention are not limited to those described above, as these are exemplary only. For two stage embodiments the second stage may be positioned within the chamber upstream of the first (as described) or the first stage may be positioned upstream of the second, relative to the flow direction of the hot gas. For the three stage embodiment, any combination of order of the stages is feasible, such as (listed from upstream to downstream) 1st, 2nd, 3rd; 3rd, 2nd, 1st; 1st, 3rd, 2nd; 3rd, 1st, 2nd; 2nd, 1st, 3rd; and 2nd, 3rd, 1st. The flow of gas through the tubes of the stages may be cross flow to the flow of hot gas through the chamber, co-current with the hot gas, counter current, and any combinations of cross current, co-current and/or counter-current for different stages.

One of the primary advantages of the current invention is to enable a hydrogen production process to use a low overall or average steam-to-carbon ratio. The steam-to-carbon ratio is a key process parameter in hydrogen production processes. Lower steam-to-carbon ratio means lower heat loss in the process, and consequently, better thermal efficiency for hydrogen production. However, the process needs to maintain a minimum steam-to-carbon ratio to prevent carbon formation on the steam reforming catalyst (catalyst coking), which is detrimental to the operation. The current invention can help to lower this minimum steam-to-carbon ratio requirement.

For the convenience of discussion, refer to FIG. 7, and recall that the first mixture 32 comprising gaseous hydrocarbon and steam, the second mixture 72 comprising gaseous hydrocarbon and optionally, steam, and the third mixture 76, also comprising gaseous hydrocarbon and, optionally, steam, are defined as fresh feeds to each corresponding stage, first, second and third respectively.

To illustrate the working mechanism of the current invention, let us compare a single stage convective reforming apparatus with the staged convective reforming apparatus of the current invention as shown in FIG. 7. Further, let us assume that the reforming catalyst requires a minimum steam-to-carbon ratio of 2.5, below which the catalyst will be coked. With a single stage reforming apparatus, the steam-to-carbon ratio of the fresh feed needs to be at least 2.5 to avoid the carbon formation problem. In the current invention, the fresh feed is partitioned among three stages, 20, 20a and 20b. The fresh feed 32 to the first stage 20 will have a steam-to-carbon ratio of 2.5 so that the reforming catalyst in the first stage will not be coked. For the fresh feed 72 to the second stage 20a, the steam-to-carbon ratio can be smaller than 2.5 without carbon formation on the catalyst in the second stage. This is possible because the first partially reformed gas 70 from the first reforming stage 20 has a steam-to-carbon ratio greater than 2.5 (e.g., >3.0), due to the conversion of hydrocarbon in the first stage. The first partially reformed gas 70 also contains a significant amount of hydrogen and less methane. All of these features help mitigate carbon formation on the reforming catalyst. Since the reforming catalyst in the second stage 20*a* sees a mixture of the first partially reformed gas 70 and the fresh feed 72 to the second stage, the steam-to-carbon ratio in the fresh feed to the second stage can be lower than 2.5. How low this value can be depends on the partition ratio of hydrocarbon between the stages and the hydrocarbon conversion level in the first partially reformed gas 70.

The same analysis is applicable to the steam-to-carbon ratio in the fresh feed 76 to the third stage 20*b*. Since the hydrocarbon conversion is greater in the second partially reformed gas 74 than the first partially reformed gas 70, its steam-to-carbon ratio is even greater (e.g., >4.0) and it contains more hydrogen and even less methane, enabling the steam-to-carbon ratio in the fresh feed 76 to the third stage 20*b* to be even lower without carbon formation on the catalyst in the third stage. Again, how low this value can be depends on the partition ratio of hydrocarbon between the stages and the hydrocarbon conversion level in the second partially reformed gas 74. As a result of this staged arrangement, the overall or average steam-to-carbon ratio of the process, i.e., the ratio of the total steam molar flows in the fresh feeds 32, 72 and 76 to the total carbon molar flows in the fresh feeds 32, 72 and 76, is smaller than 2.5. In general, the steam-to-carbon ratio of the fresh feed to a reforming stage can be lower than the steam carbon ratio in the fresh feed to the previous stage. The more stages one employs, the lower the overall steam-to-carbon ratio.

The staged hydrocarbon/steam reformer apparatus and method according to the invention also makes effective use of energy recovered from a hot gas stream to drive the reforming reactions and lessen radiant duty of the fired stages. It is expected that more heat will be recoverable from the hot gas stream as well as increased overall conversion, thereby yielding greater efficiencies than prior art methods without convective prereforming. In addition to the advantage of enabling low overall steam-to-carbon ratio, the staged arrangement provides the flexibility to better match the temperature of the hot gas with the temperature of each reforming stage, i.e., the flexibility for achieving optimal heat flux for all tubes, minimal tube and catalyst cost, and maximal heat recovery.

The following examples demonstrate that the staged hydrocarbon/steam reformer apparatus and method according to the invention mitigates carbon formation in the methane reforming process, therefore, enabling reduction in steam-to-carbon ratio and improved hydrogen production efficiency. To illustrate this advantage, cases are considered wherein methane is the only hydrocarbon in a reformer feed (hereafter referred to as methane-containing gas), and a method is introduced as follows to assess carbon formation propensity in different cases.

For pre-reforming of a methane-containing gas of low concentration of carbon monoxide and carbon dioxide, the methane cracking reaction $$CH_4 \leftrightarrow C + 2H_2$$

is the major reaction for carbon formation, and the carbon gasification reaction $$H_2O + C \leftrightarrow CO + H_2$$

is the major reaction for carbon removal. Another carbon formation reaction, the disproportionation of carbon monoxide $$2CO \leftrightarrow C + CO_2$$

is either insignificant or thermodynamically unfavorable. For relative illustration purposes, the rates for both methane cracking reaction and carbon gasification reaction may be written using the first order kinetics, i.e., $$R_1 = k_1 P_{CH4}\left(1 - \frac{P_{H2}^2}{P_{CH4} K_1}\right)$$

and $$R_2 = k_2 P_{H2O}\left(1 - \frac{P_{H2} P_{CO}}{P_{H2O} K_2}\right)$$

In these equations, subscripts 1 and 2 stand for the methane cracking reaction and the carbon gasification reaction, respectively; $k_i$ (i=1 or 2) is the rate constant for reaction i; and $K_i$ is the equilibrium constant for reaction i. The second term in the parenthesis of each rate equation is the approach to equilibrium for that reaction, i.e., $$\alpha_1 = \frac{P_{H2}^2}{P_{CH4} K_1}$$

and $$\alpha_2 = \frac{P_{H2} P_{CO}}{P_{H2O} K_2}$$

One minus the approach to equilibrium in each rate equation is the thermodynamic driving force for that reaction. A reaction can proceed in the forward direction only when the approach to equilibrium is less than one.

When both reactions proceed in the forward direction, it is the relative rates of the two reactions that determine whether carbon will form on a methane reforming catalyst. The relative rates can be represented using the ratio of the rates for the two reactions, i.e., $$\frac{R_1}{R_2} = \frac{k_1}{k_2} \frac{P_{CH4}(1 - P_{H2}^2 / P_{CH4} K_1)}{P_{H2O}(1 - P_{H2} P_{CO} / P_{H2O} / K_2)}$$

From this equation, a Carbon Formation Index (CFI) is defined as $$CFI = \frac{P_{CH4}(1 - P_{H2}^2 / P_{CH4} K_1)}{P_{H2O}(1 - P_{H2} P_{CO} / P_{H2O} / K_2)}$$

The CFI represents the propensity of a mixture to form carbon as the ratio of the contribution to carbon formation and carbon removal from the composition of a methane-containing gas. The smaller the CFI value of a gas, the smaller the relative rate $(R_1/R_2)$ for carbon formation, and the smaller carbon formation propensity. Therefore, for a given temperature, the carbon formation propensity of different methane-containing gases can be compared using their CFIs.

EXAMPLE 1

Figure 11:
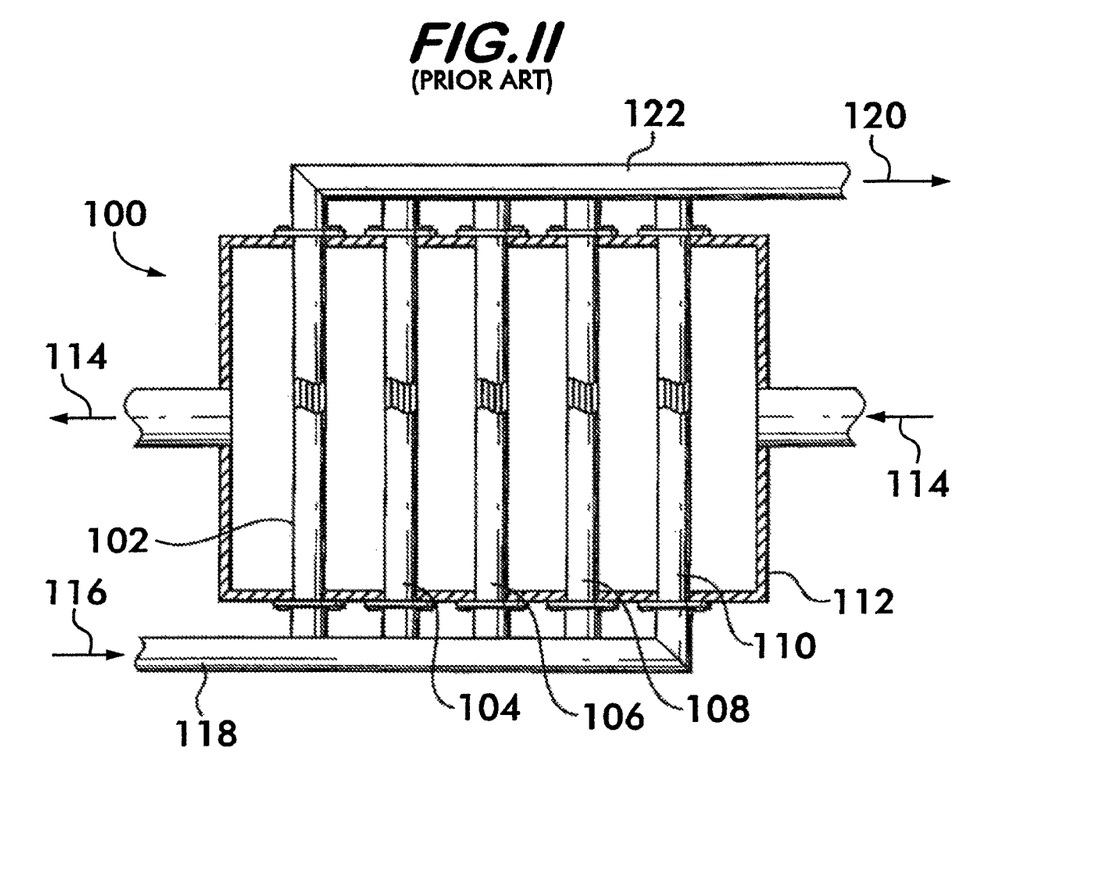
FIG. 11 is a schematic illustration of a prior art, one-stage convective reformer.

This example relates to a one-stage convective reformer apparatus 100 shown in FIG. 11. The reformer has five parallel rows of tubes 102, 104, 106, 108, 110, each containing a methane reforming catalyst. The tubes are enclosed in a convection tunnel 112, and heated by the flue gas 114 from a fired reformer furnace (not shown). The flue gas 114 approaches the convective reformer at 836° C. and exits at 738° C. The tubes are arranged in a cross flow configuration with respect to the flue gas flow with the $5^{th}$ row 110 being located upstream, $1^{st}$ row 102 downstream, and the other three rows 104, 106 and 108 in between as shown. A feed 116 comprising methane and steam enters a distribution manifold 118 that is connected to the inlets of all five rows of tubes. The partially reformed gas 120 from the outlets of all tubes is collected by a collection manifold 122. This design is examined for a methane/steam feed 116 having a total of 3890 lbmol/hr methane and 9788 lbmol/hr steam. Thus, the overall steam-to-carbon ratio is 2.5.

Table 1 shows the composition, temperature and pressure of the bulk gas at the inlets and outlets of the five rows of tubes. Since carbon formation is favored by high temperature, Table 1 also contains the highest temperature at these locations, i.e., the inner tube wall temperature or T_tube. The equilibrium constants for the methane cracking reaction ($K_1$) and carbon gasification reaction ($K_2$) are calculated at the tube wall temperature using the method of Gibbs energy minimization in the process simulator Aspen Plus™ from Aspen Technology, Inc.

The approach to equilibrium for the methane cracking reaction, $\alpha_1$, and the approach to equilibrium for the carbon gasification reaction, $\alpha_2$, at all locations are calculated from the given compositions and equilibrium constants and listed in Table 1. Carbon formation is thermodynamically possible at the inlets of all five rows of tubes since $\alpha_1$ is greatly less than one at these locations. (Carbon formation at the five outlets can be ignored, as $\alpha_1$ is either greater than 1 or very close to 1). The CFIs at the five inlet locations are listed in Table 1.

EXAMPLE 2

Figure 12:
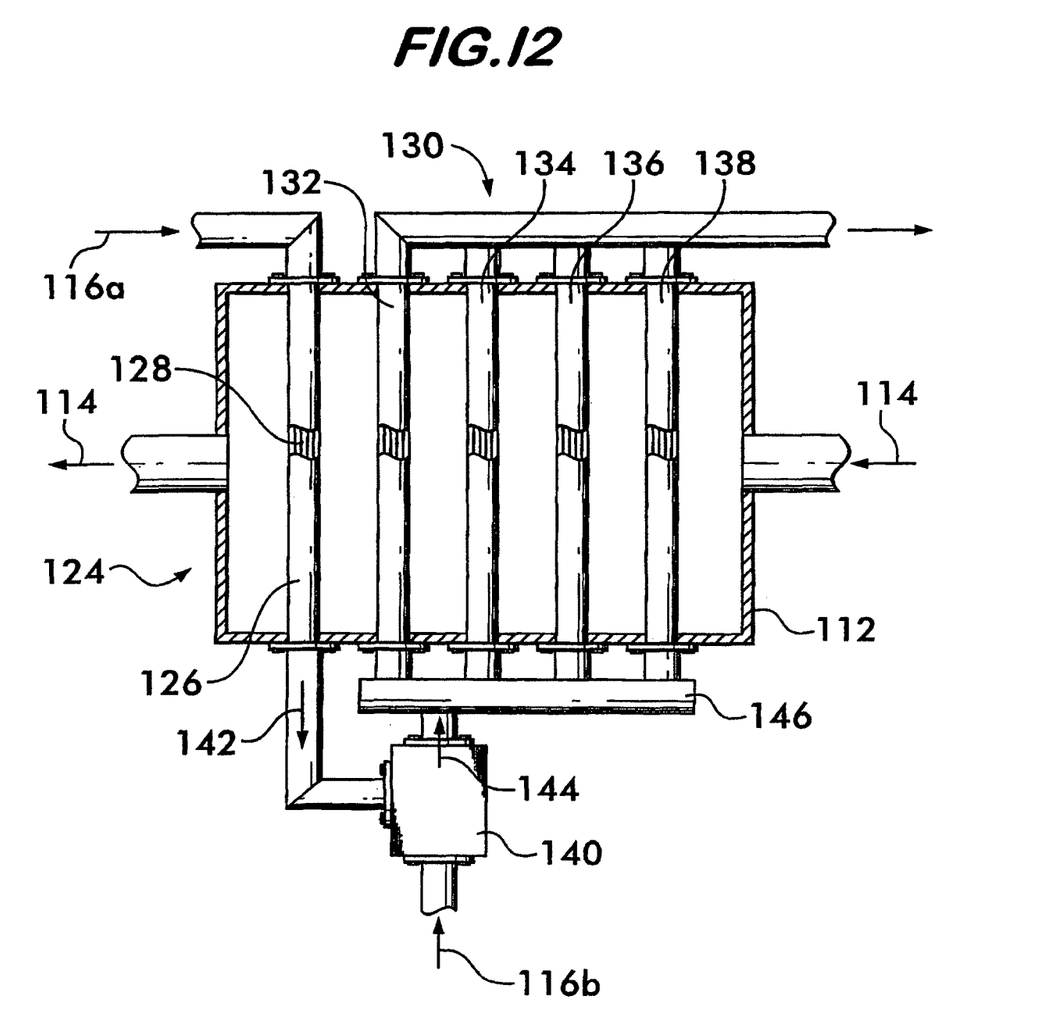
FIG. 12 is a schematic illustration of a two-stage convective reformer according to the invention.

This example relates to a two-stage convective hydrocarbon/steam reformer apparatus 124 shown in FIG. 12. The overall design is similar to that in Example 1. However, with respect to methane and steam flows, the two-stage design splits the five parallel row design in Example 1 into a first stage 126 comprising the first row of tubes 128 and a second stage 130 of the other four rows of tubes 132, 134, 136 and 138, with all tubes containing the same reforming catalyst. The overall feed flows 116a and 116b are the same as those in Example 1 comprising a total of 3890 lbmol/hr methane and 9788 lbmol/hr steam. Again, the overall steam-to-carbon ratio is 2.5. However, the feeds are distributed differently between the two stages. Twenty five percent of the total steam, 2447 lbmol/hr, is combined with 20% of the total methane, 778 lbmol/hr, and fed to the first reforming stage 126 as feed 116a. The remainder of the methane, 3112 lbmol/hr, and remainder of the steam, 7341 lbmol/hr, comprise feed stream 116b which is fed to a mixing vessel 140 where it is combined with the partially reformed gas 142 from the first stage 126. The combined mixture 144 enters a gas distribution manifold 146 that is connected to the inlets of the remaining four rows of tubes comprising the second stage 130. With this partition, the steam-to-carbon ratio in the fresh feed to the first reforming stage is 3.1, and the steam-to-carbon ratio in the fresh feed to the second reforming stage is 2.4. The composition, temperature and pressure of the bulk gas at all tube inlets and outlets are listed in Table 2. Tube wall temperatures (T_tube) are also listed at these locations; they are the same as those in Example 1.

Table 2 shows, again, that carbon formation is thermodynamically possible only at the five inlets of tubes 128, 132, 134, 136 and 138; $\alpha_1$ at these locations are greatly less than one. The CFIs at these five locations are listed in Table 2. For the same tube wall temperature at the inlet of the $1^{st}$ row 128, the CFI for the two-stage case is 20% less than that for the one-stage case shown in Example 1. Thus, the carbon formation propensity at this location is reduced by the staged arrangement. The reduction in CFI is due to the higher local steam-to-carbon ratio of 3.1 in the feed to the $1^{st}$ row in the two-stage case than the steam-to-carbon ratio of 2.5 in the one-stage case. Table 2 shows that the staged arrangement also yields reduced CFIs at the inlets for the $2^{nd}$, $3^{rd}$, $4^{th}$ and $5^{th}$ rows (132, 134, 136 and 138 respectively), by about 10%. Although the local steam-to-carbon ratio in the fresh feed to these four rows is only 2.4, the reduction in CFI is due to mixing the fresh feed 116b to these four rows with the partially reformed gas 142 from the first row of tubes 128 (i.e., the effluent of the first stage 126). This mixing increases the final steam-to-carbon ratio to the inlets of these four rows from 2.4 to around 2.5 (see S/C in Table 2). The staged arrangement also results in increased hydrogen content and reduced methane content in these four feed streams.

TABLE 1

|  | Bulk Gas T (C.) | Bulk Gas P (MPa) | Bulk Gas Composition (mol %) | | | | | | T_tube (C.) | $K_1$ (atm) | $\alpha_1$ | $K_2$ (atm) | $\alpha_2$ | CFI |
| --- | --- | --- | --- | --- | --- | --- | --- | --- | --- | --- | --- | --- | --- | --- |
|  |  |  | CH4 | H2 | H2O | CO2 | CO | N2 | S/C |  |  |  |  |  |  |
| 1st row inlet | 561.7 | 4.0 | 27.755 | 1.064 | 69.838 | 0.511 | 0.262 | 0.570 | 2.5 | 605.6 | 1.2167 | 0.0132 | 0.4542 | 0.0035 | 0.394 |
| 2nd row inlet | 561.7 | 4.0 | 27.755 | 1.064 | 69.838 | 0.511 | 0.262 | 0.570 | 2.5 | 611.1 | 1.3490 | 0.0119 | 0.4967 | 0.0032 | 0.394 |
| 3rd row inlet | 561.7 | 4.0 | 27.755 | 1.064 | 69.838 | 0.511 | 0.262 | 0.570 | 2.5 | 617.2 | 1.5099 | 0.0107 | 0.5481 | 0.0029 | 0.394 |
| 4th row inlet | 561.7 | 4.0 | 27.755 | 1.064 | 69.838 | 0.511 | 0.262 | 0.570 | 2.5 | 605.0 | 1.2029 | 0.0134 | 0.4498 | 0.0035 | 0.393 |
| 5th row inlet | 561.7 | 4.0 | 27.755 | 1.064 | 69.838 | 0.511 | 0.262 | 0.570 | 2.5 | 608.9 | 1.2947 | 0.0124 | 0.4793 | 0.0033 | 0.394 |
| 1st row outlet | 585.2 | 3.9 | 24.077 | 10.544 | 61.734 | 2.922 | 0.180 | 0.543 | 2.6 | 623.9 | 1.7051 | 1.0426 | 0.6103 | 0.0194 |  |
| 2nd row outlet | 591.2 | 3.9 | 23.773 | 11.289 | 61.103 | 3.082 | 0.212 | 0.541 | 2.6 | 634.4 | 2.0535 | 1.0050 | 0.7212 | 0.0209 |  |
| 3rd row outlet | 598.1 | 3.9 | 23.426 | 12.133 | 60.389 | 3.260 | 0.254 | 0.538 | 2.6 | 646.4 | 2.5224 | 0.9591 | 0.8708 | 0.0226 |  |
| 4th row outlet | 583.6 | 3.9 | 24.146 | 10.375 | 61.877 | 2.886 | 0.172 | 0.544 | 2.6 | 623.3 | 1.6868 | 1.0175 | 0.6045 | 0.0184 |  |
| 5th row outlet | 588.4 | 3.9 | 23.942 | 10.876 | 61.453 | 2.993 | 0.194 | 0.542 | 2.6 | 631.1 | 1.9381 | 0.9814 | 0.6845 | 0.0193 |  |

TABLE 2

| | Bulk Gas T (C.) | Bulk Gas P (MPa) | Bulk Gas Composition (mol %) | | | | | | T_tube (C.) | $K_1$ (atm) | $\alpha_1$ | $K_2$ (atm) | $\alpha_2$ | CFI |
|---|---|---|---|---|---|---|---|---|---|---|---|---|---|---|
| | | | CH4 | H2 | H2O | CO2 | CO | N2 | S/C | | | | | |
| 1st row inlet | 561.7 | 4.0 | 23.629 | 0.906 | 74.321 | 0.435 | 0.223 | 0.486 | 3.1 | 605.6 | 1.2167 | 0.0113 | 0.4542 | 0.0024 | 0.315 |
| 2nd row inlet | 561.7 | 4.0 | 26.934 | 3.184 | 68.025 | 1.053 | 0.239 | 0.564 | 2.5 | 611.1 | 1.3490 | 0.1102 | 0.4967 | 0.0089 | 0.355 |
| 3rd row inlet | 561.7 | 4.0 | 26.934 | 3.184 | 68.025 | 1.053 | 0.239 | 0.564 | 2.5 | 617.2 | 1.5099 | 0.0984 | 0.5481 | 0.0081 | 0.360 |
| 4th row inlet | 561.7 | 4.0 | 26.934 | 3.184 | 68.025 | 1.053 | 0.239 | 0.564 | 2.5 | 605.0 | 1.2029 | 0.1236 | 0.4498 | 0.0098 | 0.350 |
| 5th row inlet | 561.7 | 4.0 | 26.934 | 3.184 | 68.025 | 1.053 | 0.239 | 0.564 | 2.5 | 608.9 | 1.2947 | 0.1148 | 0.4793 | 0.0092 | 0.354 |
| 1st row outlet | 573.5 | 3.9 | 20.431 | 9.638 | 66.665 | 2.672 | 0.129 | 0.465 | 3.3 | 623.9 | 1.7051 | 1.0266 | 0.6103 | 0.0118 | |
| 2nd row outlet | 593.3 | 3.9 | 24.925 | 11.456 | 59.695 | 3.132 | 0.226 | 0.566 | 2.4 | 634.4 | 2.0535 | 0.9872 | 0.7212 | 0.0232 | |
| 3rd row outlet | 600.4 | 3.9 | 24.559 | 12.331 | 58.961 | 3.314 | 0.272 | 0.563 | 2.4 | 646.4 | 2.5224 | 0.9449 | 0.8708 | 0.0252 | |
| 4th row outlet | 585.3 | 3.9 | 25.320 | 10.509 | 60.490 | 2.930 | 0.183 | 0.569 | 2.4 | 623.3 | 1.6868 | 0.9955 | 0.6045 | 0.0203 | |
| 5th row outlet | 590.3 | 3.9 | 25.103 | 11.028 | 60.054 | 3.041 | 0.207 | 0.567 | 2.4 | 631.1 | 1.9381 | 0.9624 | 0.6845 | 0.0214 | |

EXAMPLE 3

This example relates to the same two-stage convective reformer apparatus 124 as described in Example 2. The only change is to decrease the total steam flow from 9788 to 9000 lbmol/hr, which decreases the overall steam-to-carbon ratio from 2.5 to 2.3. The percentage distribution of the methane and steam flows 116a and 116b to the two stages are the same as in Example 2. The resulting steam-to-carbon ratio of the fresh feed 116a to the first stage 126 is 2.9, and that of the fresh feed 116b to the second stage 130 is 2.2. This decrease in the overall steam-to-carbon ratio makes the CFIs at the inlets of all five rows of tubes in the two-stage convective reformer equal to or less than those in the one-stage convective reformer of Example 1. All conditions and results are shown in Table 3. Comparison of the results in Tables 1 and 3 shows that, for the same CFIs, or the same propensity or risk for carbon formation, the two-stage arrangement requires only an overall steam-to-carbon ratio of 2.3 while the one-stage arrangement requires 2.5. The staged arrangement allows a reforming process to run at lower steam-to-carbon ratio than the one-stage arrangement.

TABLE 3

| | Bulk Gas T (C.) | Bulk Gas P (MPa) | Bulk Gas Composition (mol %) | | | | | | T_tube (C.) | $K_1$ (atm) | $a_1$ | $K_2$ (atm) | $a_2$ | CFI |
|---|---|---|---|---|---|---|---|---|---|---|---|---|---|---|
| | | | CH4 | H2 | H2O | CO2 | CO | N2 | S/C | | | | | |
| 1st row inlet | 561.7 | 4.0 | 25.343 | 0.972 | 72.458 | 0.466 | 0.240 | 0.521 | 2.9 | 605.6 | 1.2167 | 0.0121 | 0.4542 | 0.0028 | 0.347 |
| 2nd row inlet | 561.7 | 4.0 | 28.711 | 3.394 | 65.915 | 1.123 | 0.255 | 0.602 | 2.3 | 611.1 | 1.3490 | 0.1175 | 0.4967 | 0.0104 | 0.388 |
| 3rd row inlet | 561.7 | 4.0 | 28.711 | 3.394 | 65.915 | 1.123 | 0.255 | 0.602 | 2.3 | 617.2 | 1.5099 | 0.1049 | 0.5481 | 0.0095 | 0.394 |
| 4th row inlet | 561.7 | 4.0 | 28.711 | 3.394 | 65.915 | 1.123 | 0.255 | 0.602 | 2.3 | 605.0 | 1.2029 | 0.1317 | 0.4498 | 0.0115 | 0.383 |
| 5th row inlet | 561.7 | 4.0 | 28.711 | 3.394 | 65.915 | 1.123 | 0.255 | 0.602 | 2.3 | 608.9 | 1.2947 | 0.1224 | 0.4793 | 0.0108 | 0.386 |

The invention claimed is:

1. A steam/hydrocarbon reformer for producing a synthesis gas comprising hydrogen from gaseous hydrocarbon and steam, said reformer being convectively heated by a hot gas and comprising:

a chamber having an entrance for receiving said hot gas and an exit for discharging said hot gas;

a plurality of first tubes positioned within said chamber, said first tubes containing a steam reforming catalyst, each of said first tubes having a first tube inlet for receiving a first mixture comprising gaseous hydrocarbon and steam and a first tube outlet for discharging a first partially reformed gas;

a mixing vessel having a first inlet in fluid communication with said first tube outlets for receiving said first partially reformed gas, a second inlet for receiving a second mixture comprising gaseous hydrocarbon, and a mixing vessel outlet;

a plurality of second tubes positioned within said chamber, said second tubes containing a steam reforming catalyst, each of said second tubes having a second tube inlet in fluid communication with said mixing vessel outlet and a second tube outlet for discharging a second partially reformed gas.

2. A reformer according to claim 1, wherein said second inlet is adapted to receive steam as part of said second mixture.

3. A reformer according to claim 1, wherein said mixing vessel comprises a Tee pipe fitting wherein said Tee pipe fitting comprises an internal bore within which static mixing elements are positioned to facilitate mixing of said first partially reformed gas and said second mixture comprising gaseous hydrocarbon.

4. A reformer according to claim 1, wherein said plurality of second tubes are positioned between said chamber inlet and said plurality of first tubes.

5. A reformer according to claim 1, wherein said pluralities of said first and second tubes are arranged within said chamber substantially parallel to a flow path of said hot gas.

6. A reformer according to claim 1, further comprising a distribution manifold having an inlet for receiving said first mixture of gaseous hydrocarbon and steam and a plurality of outlets in fluid communication with said first tube inlets.

7. A reformer according to claim 1, further comprising a collection manifold having a plurality of inlets in fluid communication with said first tube outlets and an outlet in fluid communication with said first inlet of said mixing vessel.

8. A reformer according to claim 1, further comprising a distribution manifold having an inlet in fluid communication with said mixing vessel outlet and a plurality of outlets in fluid communication with said second tube inlets.

9. A reformer according to claim 1, further comprising a collection manifold having an outlet and a plurality of inlets in fluid communication with said second tube outlets.

10. A reformer according to claim 1, further comprising:
a second mixing vessel having a first inlet in fluid communication with said second tube outlets for receiving said second partially reformed gas, a second inlet for receiving a third mixture comprising gaseous hydrocarbon, and a mixing vessel outlet;
a plurality of third tubes positioned within said chamber, said third tubes containing a steam reforming catalyst, each of said third tubes having a third tube inlet in fluid communication with said second mixing vessel outlet, each of said third tubes having a third tube outlet for discharging a third partially reformed gas.

11. A reformer according to claim 10, wherein said plurality of third tubes is positioned between said chamber entrance and said plurality of second tubes, and said plurality of first tubes is positioned between said plurality of second tubes and said chamber exit.

12. A method of steam reforming gaseous hydrocarbons to produce said synthesis gas using the reformer of claim 1, said method comprising:
heating said chamber with said hot gas;
passing said first mixture of gaseous hydrocarbon and steam through said first tubes;
transferring heat convectively from said hot gas to said first tubes;
reacting said first mixture of gaseous hydrocarbon and steam with said reforming catalyst in said first tubes to produce said first partially reformed gas having a higher concentration of hydrogen than said first mixture of gaseous hydrocarbon and steam;
combining said first partially reformed gas with said second mixture comprising gaseous hydrocarbon in said mixing vessel;
passing a mixture of said first partially reformed gas and said second mixture comprising gaseous hydrocarbon through said second tubes;
transferring heat convectively from said hot gas to said second tubes;
reacting said first partially reformed gas and said second mixture comprising gaseous hydrocarbon with said catalyst in said second tubes to produce said second partially reformed gas having a higher concentration of hydrogen than said first partially reformed gas.

13. A method according to claim 12, further comprising:
adding steam to said second mixture comprising gaseous hydrocarbon in said mixing vessel;
passing said first mixture of gaseous hydrocarbon and steam through said first tubes at a steam to carbon ratio greater than a steam to carbon ratio of said second mixture comprising gaseous hydrocarbon and steam entering said mixing vessel.

14. A method according to claim 12, further comprising passing said first mixture of gaseous hydrocarbon and steam through said first tubes at a steam to carbon ratio between about 1 and about 3.5.

15. A method according to claim 12, further comprising passing said first mixture of gaseous hydrocarbon and steam through said first tubes at a steam to carbon ratio of about 2.5.

16. A method according to claim 12, further comprising adding steam to said second mixture comprising gaseous hydrocarbon in said mixing vessel at a steam to carbon ratio up to about 2.

17. A method according to claim 12, further comprising:
providing a furnace in which combustion occurs yielding a flue gas;
passing said second partially reformed gas through a plurality of third tubes positioned within said furnace, said third tubes containing a steam reforming catalyst;
transferring heat radiantly to said third tubes; and
reacting said second partially reformed gas over said steam reforming catalyst to produce said synthesis gas.

18. A method according to claim 12, further comprising:
providing a furnace in which combustion occurs yielding a flue gas, said plurality of second tubes extending into said furnace;
passing said second partially reformed gas through said plurality of second tubes positioned within said furnace;
transferring heat radiantly to said second tubes positioned within said furnace; and
reacting said second partially reformed gas over said steam reforming catalyst in said second tubes positioned within said furnace to produce said synthesis gas.

19. A steam/hydrocarbon reformer for producing a synthesis gas comprising hydrogen from gaseous hydrocarbon and steam, said reformer being convectively heated by a hot gas and comprising:
a chamber having an entrance for receiving said hot gas and an exit for discharging said hot gas;
a plurality of reformer stages in serial fluid communication with one another, each reformer stage being positioned within said chamber and comprising:
a plurality of tubes containing a steam reforming catalyst, each of said tubes having an inlet for receiving a gas and an outlet for discharging a gas;
a plurality of mixing vessels, one said mixing vessel being positioned between each said reformer stage, each said mixing vessel having a first inlet in fluid communication with said tubes of one of said reformer stages, a second inlet for receiving a mixture comprising gaseous hydrocarbon, and a mixing vessel outlet in fluid communication with said tubes of another of said reformer stages.

20. A reformer according to claim 19, comprising:
a first and a second of said reformer stages, said first stage receiving a first mixture of gaseous hydrocarbon and steam;
one of said mixing vessels positioned between said first and second reformer stages, said second reformer stage being in serial communication with said first reformer stage through said mixing vessel and receiving a first partially reformed gas from said first reformer stage, and a second mixture comprising gaseous hydrocarbon from said mixing vessel.

21. A reformer according to claim 20, comprising:
a third of said reformer stages;
a second one of said mixing vessels positioned between said second and third reformer stages, said third reformer stage being in serial communication with said second reformer stage through said second mixing vessel and receiving a second partially reformed gas from said second reformer stage, and a third mixture comprising gaseous hydrocarbon from said second mixing vessel.

22. A reformer according to claim 20, wherein said second reformer stage is positioned between said entrance and said first reformer stage.

23. A reformer according to claim 21, wherein said third reformer stage is positioned between said entrance and said second reformer stage, and said first reformer stage is positioned between said exit and said second reformer stage.

24. A method of steam reforming of gaseous hydrocarbon and steam using the apparatus according to claim 19, said method comprising:
   heating said chamber with said hot gas;
   passing said gaseous hydrocarbon and steam serially through said plurality of reformer stages;
   transferring heat convectively to said gaseous hydrocarbon and steam in each of said reformer stages;
   reacting said gaseous hydrocarbon and steam over said reforming catalyst in each of said reformer stages thereby producing a partially reformed gas with an increased hydrogen concentration after each of said reformer stages;
   mixing a fresh feed comprising gaseous hydrocarbon with said partially reformed gas between each of said reformer stages.

25. A method according to claim 24, wherein said fresh feed comprises gaseous hydrocarbon and steam, said fresh feed at each of said reformer stages having a lower steam to carbon ratio than the steam to carbon ratio of said fresh feed at a preceding said reformer stage.

* * * * *